US012603596B2

(12) United States Patent
Saadat et al.

(10) Patent No.: US 12,603,596 B2
(45) Date of Patent: Apr. 14, 2026

(54) POWER SUPPLY CIRCUIT IN AN INVERTER FOR DRIVING AN ELECTRICAL MACHINE, METHOD OF OPERATING THE POWER SUPPLY CIRCUIT AND SAFETY CONTROL DEVICE

(71) Applicant: SEG Automotive Germany GmbH, Stuttgart (DE)

(72) Inventors: Nima Saadat, Stuttgart (DE); Murugaperumal Devaraja, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 217 days.

(21) Appl. No.: 18/639,667

(22) Filed: Apr. 18, 2024

(65) Prior Publication Data

US 2024/0356476 A1      Oct. 24, 2024

(30) Foreign Application Priority Data

Apr. 18, 2023    (DE) .......................... 102023109763.6

(51) Int. Cl.
*H02P 27/06*        (2006.01)
*H02J 9/04*         (2006.01)

(52) U.S. Cl.
CPC ................ *H02P 27/06* (2013.01); *H02J 9/04* (2013.01)

(58) Field of Classification Search
CPC .................................... H02P 27/06; H02J 9/04
See application file for complete search history.

(56) References Cited

U.S. PATENT DOCUMENTS

| | | | | |
|---|---|---|---|---|
| 2014/0265979 | A1* | 9/2014 | Xu ............................ | H02P 6/34 |
| | | | | 318/478 |
| 2019/0061654 | A1 | 2/2019 | Tsuji et al. | |
| 2025/0088095 | A1* | 3/2025 | Elshaer ............... | H02M 1/4233 |

FOREIGN PATENT DOCUMENTS

| | | | |
|---|---|---|---|
| EP | | 1561269 A1 | 8/2005 |
| WO | WO 2004042888 A1 | | 5/2004 |

* cited by examiner

*Primary Examiner* — Zoheb S Imtiaz
(74) *Attorney, Agent, or Firm* — Cozen O'Connor

(57)            ABSTRACT
A power supply circuit in an inverter for driving an electrical machine includes a high-voltage branch, a low-voltage branch, a backup supply branch, an operating DC/DC converter, which is connected on the one hand to the high-voltage branch and on the other hand to the low-voltage branch, a backup supply DC/DC converter, which is connected on the one hand to the high-voltage branch and on the other hand to the backup supply branch, an inverter circuit for connecting the electrical machine to the high-voltage branch, and a safety control device which is set up to switch the inverter circuit to a safe state when a shutdown situation is present, wherein the inverter circuit and the safety control device are supplied with energy from the low-voltage branch, wherein the inverter circuit and the safety control device are additionally supplied or can be supplied with energy from the backup supply branch.

19 Claims, 8 Drawing Sheets

POWER SUPPLY CIRCUIT IN AN INVERTER FOR DRIVING AN ELECTRICAL MACHINE, METHOD OF OPERATING THE POWER SUPPLY CIRCUIT AND SAFETY CONTROL DEVICE

CROSS-REFERENCE TO RELATED APPLICATIONS

This application claims priority to German Patent Application No. 102023109763.6 filed Apr. 18, 2023 and hereby incorporated by reference.

TECHNICAL FIELD

The present disclosure relates to a power supply circuit in an inverter for controlling an electrical machine, a method for operating the power supply circuit and a safety control device.

BACKGROUND

A power supply circuit of an inverter or in an inverter is also referred to as a PDN or PDTN (power distribution network or power distribution tree network) in modern vehicle applications with an electric drive. The task of this power distribution network is, among other things, to distribute power to the various components or consumers of the inverter, such as sensors, communication circuits (e.g. CAN, LIN transceivers) and in particular the gate driver circuits for high-side (HS) and low-side (LS) switches, and functional safety circuits or MCU (microcontroller unit), etc. In this sense, the inverter is a device which internally has the power supply circuit and components supplied by it, including switches, e.g. in the form of half bridges, and terminals for connecting external power sources and an electrical machine.

Nowadays, due to functional safety requirements, there can be two main power sources for the PDN. A common power source in electric vehicles (EV) is low-voltage batteries (e.g. 12 V), also known as the KL.30 network or low-voltage branch. A second source can be a high-voltage DC battery or the high-voltage DC bus (high-voltage branch) with a nominal voltage of 400 V to more than 1,000 V, for example. Such high-voltage, HV, networks can be used in particular as a power supply for an electric traction drive, such as a permanent magnet synchronous motor (PMSM), which is connected to the high-voltage branch via the inverter.

In the event of an incident or an emergency shutdown, the inverter should switch to a predefined safe state. To prevent the DC link capacitors from being charged by the electrical machine (especially when using PMSM), the active short circuit (ASC) technique is usually used, whereby all low-side (LS) switches or all high-side (HS) switches are usually closed, thereby stopping the transfer of energy from the electrical machine to the DC link.

EP 1 561 269 A1 relates to an on-board electrical network with at least two partial on-board electrical networks, in each of which a supply voltage is available. Furthermore, a load is provided which is connected to one of the sub-board networks. The load can be supplied with a supply voltage via two different supply paths. The two supply paths are decoupled from each other by decoupling means.

SUMMARY

According to the disclosure, a power supply circuit in an inverter for controlling an electrical machine, in particular in a vehicle, a method for operating the power supply circuit and a safety control device with the features of the independent patent claims are proposed. Advantageous embodiments are the subject of the dependent claims and the following description. It should be emphasized that the features and advantages described below apply equally to the power supply circuit and the method for operating such a circuit.

The disclosure describes a way of improving the power supply in a power supply circuit in an inverter in such a way that a safe state of the inverter or the electrical machine in the vehicle is reliably achieved even in the event of a fault.

Specifically, the power supply circuit has at least three different branches, namely a high-voltage branch, a low-voltage branch and a backup supply branch. The high-voltage branch is set up to be connected to a high-voltage network (in particular in the vehicle) and the low-voltage branch is set up to be connected to a low-voltage network (in particular in the vehicle), with a nominal voltage level of the high-voltage network being higher than a nominal voltage level of the low-voltage network. The high-voltage branch and the low-voltage branch have corresponding terminals for connecting to the high-voltage network or low-voltage network. In particular, these terminals are led out of a housing of the inverter.

The nominal voltage level of the high-voltage network (hereinafter also referred to as the high-voltage level) can, for example, be significantly more than a permissible touch voltage, in particular 60 V, e.g. up to several hundred volts. The nominal voltage level of the low-voltage network and the backup supply branch can, in particular, be essentially the same, i.e. deviate from each other by no more than a threshold value of e.g. 5 V, and can, for example, correspond to standard vehicle low voltages of e.g. 12 V or 24 V.

The high-voltage branch is connected to the low-voltage branch via an operating DC/DC converter, and the high-voltage branch is connected to the backup supply branch via a backup supply DC/DC converter that is different from the operating DC/DC converter. In this way, both branches can also be supplied with current or energy from the high-voltage branch—if the DC/DC converters are operating correctly—although two different DC/DC converters are used to increase functional safety and reliability. In the event of a defect in the operating DC/DC converter, the backup supply branch continues to be supplied. There is also an inverter circuit or power converter circuit for connecting the electrical machine to the high-voltage branch.

As is known, an inverter circuit or a power converter circuit is used to connect the AC voltage terminals of the electrical machine to the DC voltage terminals of the high-voltage network. For this purpose, the inverter circuit has a number of semiconductor switches, each of which can be opened (non-conducting) and closed (conducting) in accordance with a control signal. The semiconductor switches can comprise MOSFETs and IGBTs, for example gallium nitride (GaN) or silicon carbide (SiC) FETs.

The inverter circuit, in turn, is supplied with energy or current from the low-voltage branch. In one embodiment, the inverter circuit can have a number of high-side semiconductor switches and a number of low-side semiconductor switches and at least one gate driver circuit for one or more of the semiconductor switches in each case, with the at least one gate driver circuit for the high-side or low-side semiconductor switches being supplied with energy from the low-voltage branch. A gate driver circuit is used to apply a drive signal to a control terminal of a semiconductor switch (e.g. gate terminal of MOSFET). In one embodiment, at least the gate driver circuit of the LS semiconductor switch (hereinafter referred to as LS gate driver circuit) and/or the gate driver circuit of the HS semiconductor switch (hereinafter referred to as HS gate driver circuit) is or can be supplied with energy from the backup supply branch. This means, for example, that a safe state can still be brought about by an active short circuit even in the event of a fault or failure of the low-voltage branch. The at least one gate driver circuit for the high-side or low-side semiconductor switches can be supplied with voltage from at least one bias voltage supply circuit, which in turn can be supplied with energy from the backup supply branch. Alternatively, the at least one gate driver circuit for the high-side or low-side semiconductor switches can also be supplied with energy directly from the backup supply branch, bypassing the bias voltage supply circuit.

The power supply circuit also has a safety control device, which is also supplied with power from the low-voltage branch. The safety control device is set up to switch the inverter circuit to a safe state if a shutdown situation occurs. In particular, this can be the creation of an active short circuit (determining the type of active short circuit (HS/LS) and closing all HS switches or closing all LS switches). The presence of a shutdown situation is determined in particular when a fault occurs or is detected.

To increase functional safety, the inverter circuit and the safety control device can now also be supplied with power from the backup supply branch.

The method according to the disclosure for operating a power supply circuit according to the disclosure comprises bringing the inverter circuit into a safe state when a shutdown situation is present.

A safety control device according to the disclosure, e.g. an integrated circuit (e.g. IC, ASIC or FPGA), is set up, in particular in terms of program and/or circuit technology, to carry out a method according to the disclosure.

The disclosure significantly increases the functional safety of power supply circuits of inverters, which has particular advantages in terms of personal safety, especially in cases with a high-voltage branch. The disclosure requires only very few regular components for implementation and can therefore be realized very simply and cost-effectively.

In one embodiment, each of the operating DC/DC converter and the backup supply DC/DC converter can optionally be a non-isolating DC/DC converter, such as a buck converter, synchronous converter, SEPIC converter (single ended primary inductance converter), Ćuk converter, zeta converter, etc. With non-isolating DC/DC converters, there is no galvanic isolation between the input network and the output network. These are usually inexpensive to use.

In one embodiment, each of the operating DC/DC converter and the backup supply DC/DC converter can optionally also be an isolating DC/DC converter, such as a fly-back converter, forward converter, push-pull converter, etc. With insulating DC/DC converters, there is galvanic isolation between the input network and the output network, which is usually achieved by means of a transformer. These have increased safety, but are more complex in terms of weight, installation space and costs. In the high-voltage range (>60 V), the use of an insulating DC/DC converter is advantageous or even mandatory for safety reasons.

In one embodiment, a blocking circuit is arranged between the low-voltage branch and the backup supply branch, which prevents a flow of energy between the low-voltage branch and the backup supply branch. This prevents faults in one of the two branches from affecting the other. Such a blocking circuit can in particular have one or more diodes and/or switches at any existing connection points. The switches can include semiconductor switches or mechanical switches (relays). Connection points may exist if a supplied component, such as the inverter circuit, only has one power supply connection, which must then be connected or connectable to both the low-voltage branch and the backup supply branch. This is a very simple measure in terms of design and circuitry in order to realize a common but non-reactive power supply.

In one embodiment, the low-voltage branch has a supply branch and a mains branch, wherein the inverter circuit and the safety control device are supplied with energy from the supply branch and wherein the mains branch is set up to be connected to a voltage supply, such as the low-voltage network. A second blocking circuit, such as a diode, is arranged between the supply branch and the operating DC/DC converter, which prevents a flow of energy from the supply branch into the operating DC/DC converter, and/or is arranged between the supply branch and the mains branch, which prevents a flow of energy from the supply branch into the mains branch. In particular, this also allows faults in the low-voltage network or in the operating DC/DC converter to be isolated from the supply branch.

In one embodiment, the operating DC/DC converter can be disconnected from the low-voltage branch by means of a first safety disconnection circuit and/or can be disconnected from the high-voltage branch by means of a first high-voltage disconnection circuit. This means that in the event of a fault in the low-voltage branch, damage to the operating DC/DC converter or the high-voltage branch can be avoided, or in the event of a fault in the operating DC/DC converter, damage to the low-voltage branch or the high-voltage branch can be avoided.

In one embodiment, the gate driver circuit for the high-side (HS) semiconductor switches can be disconnected from the low-voltage branch by means of a second safety disconnection circuit. This prevents the low-voltage branch from being affected in the event of a fault in the HS gate driver circuit.

In one embodiment, the gate driver circuit for the low-side (LS) semiconductor switches can be disconnected from the low-voltage branch by means of a third safety disconnection circuit. This means that in the event of a fault in the LS gate driver circuit, impairment of the low-voltage branch can be avoided, and in the event of a fault in the low-voltage branch, impairment of the LS gate driver circuit can be avoided. As explained above, the LS gate driver circuit is in particular also supplied or can be supplied from the backup supply branch, so that in the event of a fault in the low-voltage branch, this can or will be disconnected.

In one embodiment, the backup supply DC/DC converter can be disconnected from the backup supply branch by means of a fourth safety disconnection circuit and/or can be disconnected from the high-voltage branch by means of a second high-voltage disconnection circuit. This means that in the event of a fault in the backup supply branch, damage to the backup supply DC/DC converter or the high-voltage branch can be avoided, or in the event of a fault in the backup supply DC/DC converter, damage to the backup supply branch or the high-voltage branch can be avoided.

In fault-free operation, each of the safety disconnection circuits and high-voltage disconnection circuits can be closed or conducting, so that all branches are connected and functional as described above. Each of the safety disconnection circuits and high-voltage disconnection circuits can optionally be set up to open, i.e. to switch to a non-conductive state, in response to an external opening signal and/or when a fault is detected, such as when a current value of a current flowing through them is exceeded.

Each of the safety disconnection circuits and high-voltage disconnection circuits can optionally comprise one or more semiconductor switches or mechanical switches (relays). The high-voltage disconnection circuits in particular can also be passively openable and designed in the form of fuses, e.g. also fuses.

In one embodiment, the safety control device is set up to detect the presence of a shutdown situation if at least one of the first, second, third and fourth safety disconnectors is in a non-conductive state. This allows a shutdown situation to be reliably detected.

In one embodiment, the safety control device is set up to detect the presence of a shutdown situation if the operating DC/DC converter and/or the backup supply DC/DC converter is faulty. This allows a safe state to be reliably established in such fault situations.

In one embodiment, the safety control device and/or the inverter circuit each have at least two power supply circuits, whereby a first of the at least two power supply circuits is supplied or can be supplied with energy from the low-voltage branch and a second of the at least two power supply circuits is supplied or can be supplied with energy from the backup supply branch. Such a solution with two (in particular redundant) power supply circuits means that a connection point between the low-voltage branch and the backup supply branch can be avoided, which also simplifies or possibly eliminates the need for the above-mentioned blocking circuit. A power supply circuit is used to generate the required voltages in the supplied component from an input voltage, in this case at the low-voltage level. Typically, a power supply circuit itself can have DC/DC converters, low dropout regulators (LDO), etc.

Further advantages and embodiments of the disclosure are shown in the description and the accompanying drawing.

The disclosure is illustrated schematically in the drawing by means of embodiment examples and is described below with reference to the drawing.

DETAILED DESCRIPTION

Figure 1:
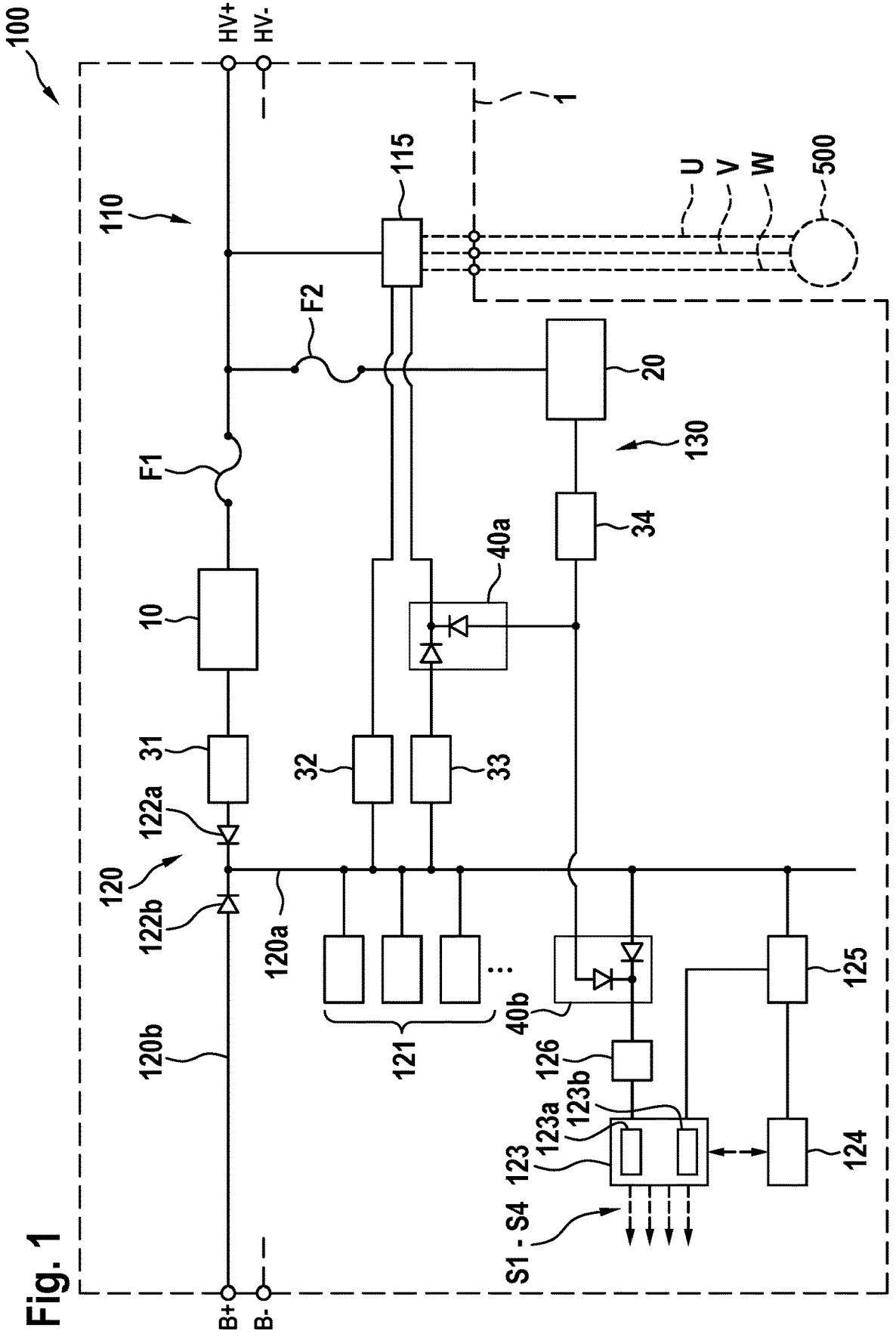
FIG. 1 schematically shows a power supply circuit in an inverter, in embodiments.

In the following, embodiments of the disclosure are described in a coherent and comprehensive manner with reference to the figures. In order to reduce the complexity of the figures, not all connections and signal flows are shown. Signal flows shown in the figures are used to request the safe state (safe-to-state requirements or ASC requirements for the HS and LS gate drivers). Return lines or earth or negative lines are also not shown in all events.

FIGS. 1, 2, 4, 6 and 7 schematically show slightly different embodiments of a power supply circuit 100 according to the disclosure in an embodiment of an inverter 1 according to the disclosure. In vehicles, an inverter is usually a component or device that controls the electrical machine. In particular, the inverter can implement torque and speed control and, in doing so, convert the DC voltage on the vehicle electrical network side into AC voltage on the engine side and—in the case of recuperation-conversely convert the AC voltage on the engine side into DC voltage on the vehicle electrical network side and feed it into the vehicle electrical network.

The power supply circuit 100 has a high-voltage branch 110 with a high-voltage terminal HV+, HV− for connecting a high-voltage network with a high-voltage level, a low-voltage branch 120 with a low-voltage terminal B+, B− for connecting a low-voltage network (so-called KI.30 (terminal 30) network) with a low-voltage level and a backup supply branch 130 with the low-voltage level. The high-voltage level is, for example, in the range from 400 V to 1,000 V. The low-voltage level can be 12 V or 24 V, for example.

The high-voltage branch 110 is connected to the low-voltage branch 120 via an operating DC/DC converter 10. The high-voltage branch 110 is also connected to the backup supply branch 130 via a backup supply DC/DC converter 20.

The low-voltage branch 120 has a supply branch 120a, which in the broadest sense serves to supply power to the components of the inverter 1, and a mains branch 120b, which is connected to the low-voltage network. The supply branch 120a can also be referred to as PDN (see above). The supply branch 120a is connected via diodes 122a, 122b as second blocking circuits on the one hand to the operating DC/DC converter 10 and on the other hand to the mains branch 120b.

An inverter circuit 115 is used to connect the AC voltage terminals U, V, W (three in the example shown) of an electrical machine 500, which is not part of the power supply circuit 100, to the positive DC voltage terminal HV+ and the negative DC voltage terminal HV− of the high-voltage branch 110. For this purpose, the inverter circuit 115 can comprise a logic circuit 118 for generating control signals and a number of semiconductor switches 116a, 116b to be controlled by means of the control signals. The inverter 1 (i.e. the entire device) has a housing from which the terminals HV+, HV−, B+, B−, U, V, W and, in particular, communication (e.g. CAN, LIN, etc.) and/or sensor (e.g. speed, angular position, temperature, etc.) and/or other terminals are led out. The inverter 1 can advantageously be structurally connected to the electrical machine 500, i.e. in particular attached to it.

The inverter circuit 115 has so-called high-side, HS switches 116a (each between an AC voltage terminal U, V, W of the electrical machine 500 and the positive DC voltage terminal HV+) and so-called low-side, LS switches 116b (each between an AC voltage terminal U, V, W of the electrical machine 500 and the negative DC voltage terminal HV−). A HS power supply circuit 200 is provided in the present case for controlling the HS switches 116a, and a LS power supply circuit 300 is provided in the present case for controlling the LS switches 116b. The elements of the HS power supply circuit 200 and the LS power supply circuit 300 are each provided with a reference sign increased by 100 and are described together in the following.

Each of the switches 116a, 116b has a control terminal 117 (e.g. gate terminal of a MOSFET or IGBT) to which a control signal is applied by a so-called gate driver circuit 210, 310 (hereinafter also referred to simply as gate driver) in order to switch the switch.

Modern isolated gate drivers generally require a low-voltage supply VCC1 for the primary side. This can usually be 5V or 3.3V and is generated from the low voltage via low dropout regulators (LDO) 220, 320, for example.

To turn on and off power semiconductor switches such as SiC MOSFET and IGBT, each gate driver usually requires two different voltage levels on the secondary side (i.e. on the side connected to gate 117 of switches 116a, 116b): a positive level VCC2 (e.g. +20 V for SiC MOSFET) and a negative level VEE (e.g. −4 V for SiC MOSFET), but this is not limited to these two voltage levels.

In order to safely control the switches 116a, 116b under normal conditions and also during active short circuits, an isolated gate driver power supply, also referred to as an isolated bias voltage supply, is used. To increase the reliability of the system, three HS bias voltage supply circuits 230 are used for the HS gate drivers 210 and three LS bias voltage supply circuits 330 are used for the LS gate drivers 310. It should be noted that there are other ways to realize the bias voltage supply, for example, using a flyback transformer having a plurality of windings as the HS bias voltage supply circuit and using another flyback transformer also having a plurality of windings as the LS bias voltage supply circuit, which also results in isolated bias supplies.

To realize a bias voltage supply, a voltage may be required that is above the nominal voltage level of the low-voltage branch 120 or backup supply branch 130. If, in such a case, the bias voltage supply circuits 230, 330 are not able to increase the voltage accordingly, pre-regulator power supply units 240, 340 can be used to supply the bias voltage supply circuits 230, 330. In particular, these pre-regulator power supplies 240, 340 also comprise a DC/DC converter and convert the low-voltage level (e.g. 12 V or 15 V) to a higher voltage (e.g. 24 V). If the isolated bias voltage supply circuits have the ability to increase the voltage sufficiently (e.g., using a boost-blocking converter), then these bias power supplies 240, 340 are not necessary.

Since modern gate drivers can receive a safety request (e.g. for ASC) on both the primary and the secondary side (the primary chip is isolated from the secondary chip of the gate driver), it can receive two (safe-state) signals S1, S2 and S3, S4 respectively; one (S2, S4) for the primary side and one (S1, S3) for the secondary side. These signals are shown with dashed lines.

Modern isolated gate drivers are capable of receiving two types of safety signals, an ASC enable signal (ASC_EN), which requests the safe state, and an ASC state signal (ASC_ST), which specifies the type of safe state. To reduce the complexity of the figures, only one signal S1 to S4 per side (primary, secondary) is shown. However, it should be noted that each of the signals S1 to S4 can internally comprise several types of safety signals.

Furthermore, one or more low-voltage consumers 121 of the inverter 1, only schematically indicated, are arranged in the supply branch 120a, e.g. sensors (e.g. speed, angular position, temperature, etc.), communication devices (CAN transceiver, LIN transceiver, etc.), etc.

Furthermore, a (functional) safety control device 123 is provided in the supply branch 120a, i.e. a functional safety control device. The task of such a safety control device is, in particular, to monitor the inverter 1, to determine the state of the inverter 1 and, if necessary, to aggregate the signals S1 to S4 for the safe state so that the inverter circuit can operate with normal drive control or switch to a safe state such as ASC or the like. In order to realize this, it is advantageous if the safety control device 123 communicates with many components or modules of the inverter 1 as possible and also with a higher-level or supervisory control unit 124, such as a so-called MCU (motor control unit or microcontroller unit), in order to achieve a desired "Automotive Safety Integrity Level" (ASIL) in particular (depending on the functional safety objectives). The communication and signal transmission between the safety control unit 123 and the higher-level control unit 124 is shown as a double arrow with a dashed line.

To increase safety, a power management circuit 125 for the power supply is provided for the control unit 124, for example in the form of a so-called PMIC (power management IC, integrated circuit) or safety PMIC. A safety PMIC integrates several DC/DC converters in one housing. The component usually has built-in protective functions such as soft start, pulse current limiting, independent voltage monitoring, temperature measurement and shutdown in the event of excessive power loss. A PMIC usually has a watchdog timer to ensure the integrity of the microcontroller used in the system.

The safety control device 123 is supplied with power or energy by a power supply circuit 126. To increase safety, the safety control device 123 is also simultaneously supplied with power by the power management circuit 125. In order to achieve the objective of functional safety (e.g. ASIL D), the safety control device 123 may have two separate safety logic circuits 123a, 123b which have two independent power supplies. The first safety logic circuit 123a is supplied by the power supply circuit 126 and the second safety logic circuit 123b is supplied by the power management circuit 125. In the event of a power failure in one of the two safety logic circuits, the other safety logic circuit can ensure the transition to a safe state.

In some concepts, the safety control device 123 and the higher-level control unit 124 are powered only by the power management circuit 125, although a second source is usually considered to increase reliability and ensure fulfilment of the functional safety objective.

In order to achieve a desired level of functional safety, the safety control device 123 and the higher-level control unit 124 can be supplied with different measurement signals, such as temperatures, speed, the voltage of various parts of the inverter circuit or the vehicle electrical network, etc., error or health states/signals from power supplies, sensors, gate drivers, main switches, etc.

In power supply circuits not according to the disclosure without a backup supply branch 130, faults (open circuit or short circuit) may lead to an interruption of the power supply for the supply branch 120a or to a latent fault and affect the safety control device 123 or the power supplies of the gate drivers in such a way that a transition to the safe state for the inverter circuit 125 is not possible. In order to counter such situations advantageously, additional precautions are taken in the power supply circuit, which are described below.

Additional safety disconnection circuits 31 to 34 are added to the power supply circuit to protect the power supply as a whole and to isolate faulty areas from the rest of the network. The safety disconnection circuits 31 to 34 prevent a fault from propagating in the power supply circuit and also latent faults. The safety disconnection circuits 31 to 34 can communicate with the safety control device 123 and higher-level control unit 124 (communication links not shown).

The safety control device 123 is set up to bring the inverter circuit 115 into a safe state if a shutdown situation is present, the presence of a shutdown situation being detected in particular if at least one of the safety disconnection circuits 31 to 34 is in an open state.

A first safety disconnection circuit 31 is added in series with the operating DC/DC converter 10. When a fault occurs in the operating DC/DC converter 10, the first safety disconnection circuit 31 may open, thereby protecting the supply branch 120*a* and interrupting the fault current, as well as informing the safety control device 123 and/or the higher-level control unit 124 of the fault (if necessary). The LS power supply circuit 300 and safety control device 123 can then be supplied from the mains branch 120*b* and/or from the high-voltage branch 110 via the backup supply branch 130.

A second safety disconnection circuit 32 is added in series with the HS power supply circuit 200. If a fault occurs in the HS power supply circuit 200, the second safety disconnection circuit 32 can open, thereby protecting the supply branch 120*a* and interrupting the fault current, as well as informing the safety control device 123 and/or the higher-level control unit 124 of the fault (if necessary).

A third safety disconnection circuit 33 is added in series with the LS power supply circuit 300. If a fault occurs in the LS power supply circuit 300, the third safety disconnection circuit 33 can open and thereby protect the supply branch 120*a* and interrupt the fault current, as well as inform the safety control device 123 and/or the higher-level control unit 124 of the fault (if necessary). The LS power supply circuit 300 can then be supplied from the high-voltage branch 110 via the backup supply branch 130.

A fourth safety disconnection circuit 34 is added in series with or as part of the backup supply DC/DC converter 20. If a fault occurs in or downstream of the backup supply DC/DC converter 20, the fourth safety disconnection circuit 34 can open, thereby protecting the supply branch 120*a* and interrupting the fault current, as well as informing the safety control device 123 and higher-level control unit 124 of the fault (if necessary).

Figure 8:
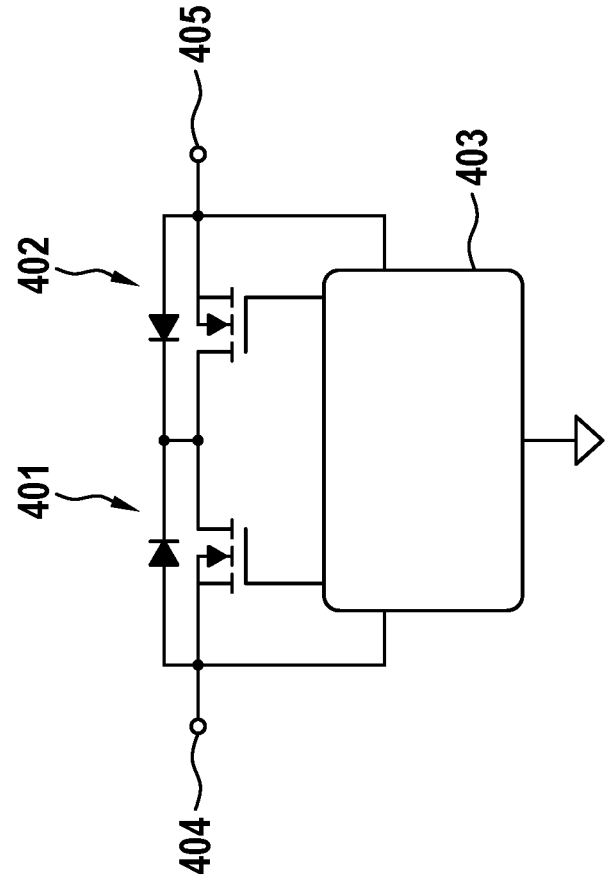
FIG. 8 schematically shows a safety disconnection circuit, as can be used in a power supply circuit, in embodiments.
Figure 8:

All of these safety disconnection circuits 31 to 34 can be designed as diagnostic and monitoring modules with an integrated control circuit and protect against short circuit, ground fault, overvoltage and also undervoltage, and can block reverse currents. An example of a simplified disconnection circuit 400 is shown in FIG. 8. In general, a safety disconnection circuit 400 can be implemented using electronic switches 401, 402 such as MOSFETs and a control circuit 403 that receives signals, in particular with respect to current and/or voltage, from input 404 and output 405 and controls the gate of the MOSFETs.

As shown in FIGS. 1, 2, 4, 6 and 7, the high-voltage branch 110 is connected to the backup supply branch 130 via a backup supply DC/DC converter 20. This converts the high voltage (e.g. 400 V or 800 V or even higher voltages) into low voltage (e.g. close to 12 V). Since the backup supply DC/DC converter 20 is connected to a high-voltage source (high-voltage grid), the fourth safety disconnection circuit 34 is connected in series to protect the supply branch 120*a* and the inverter components from damage in the event of a high-voltage short circuit. The backup supply branch 130 establishes a connection to the LS power supply circuit 300 and also to the safety control device 123.

Figure 2:
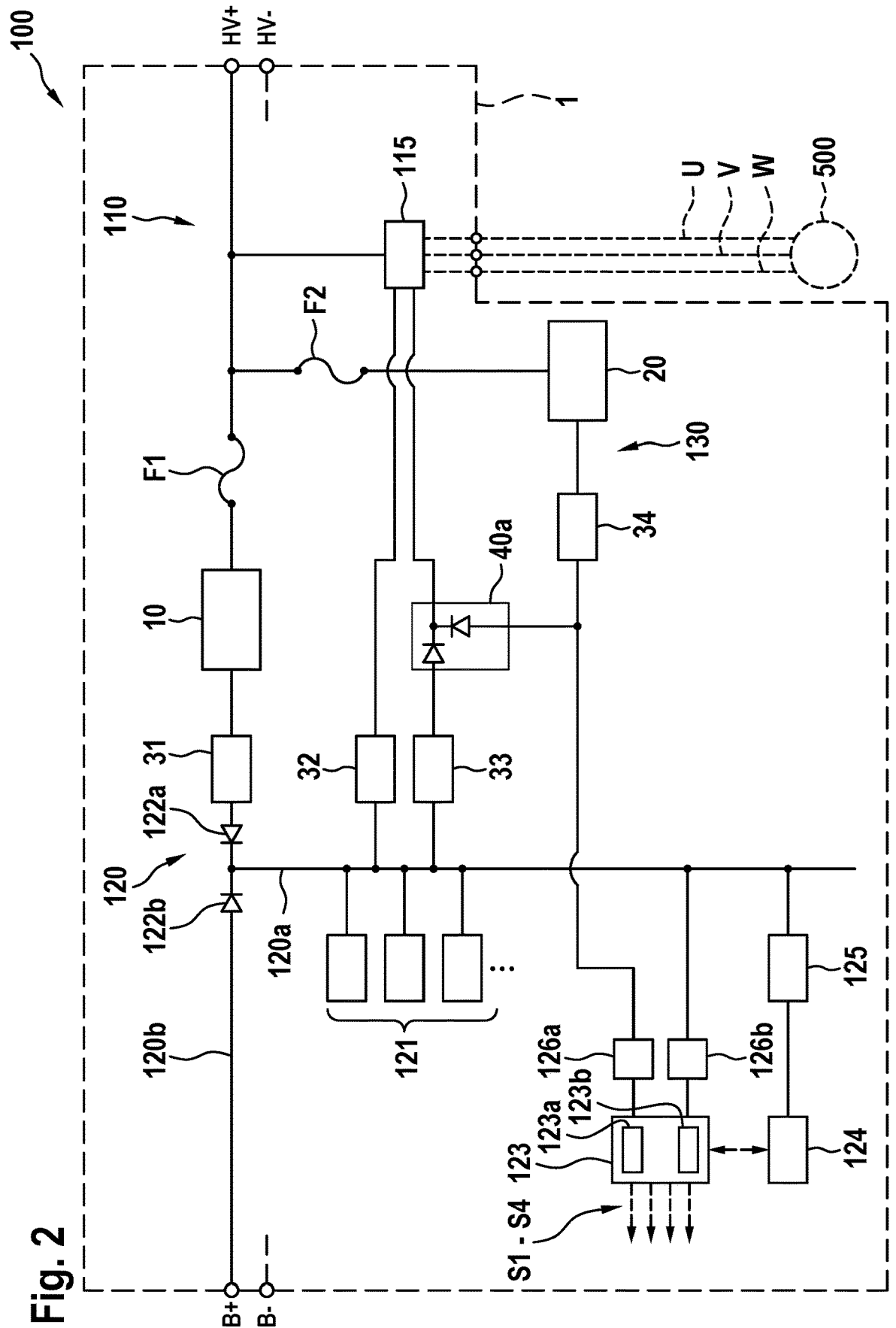
FIG. 2 schematically shows a further power supply circuit in an inverter, in embodiments.
Figure 3:
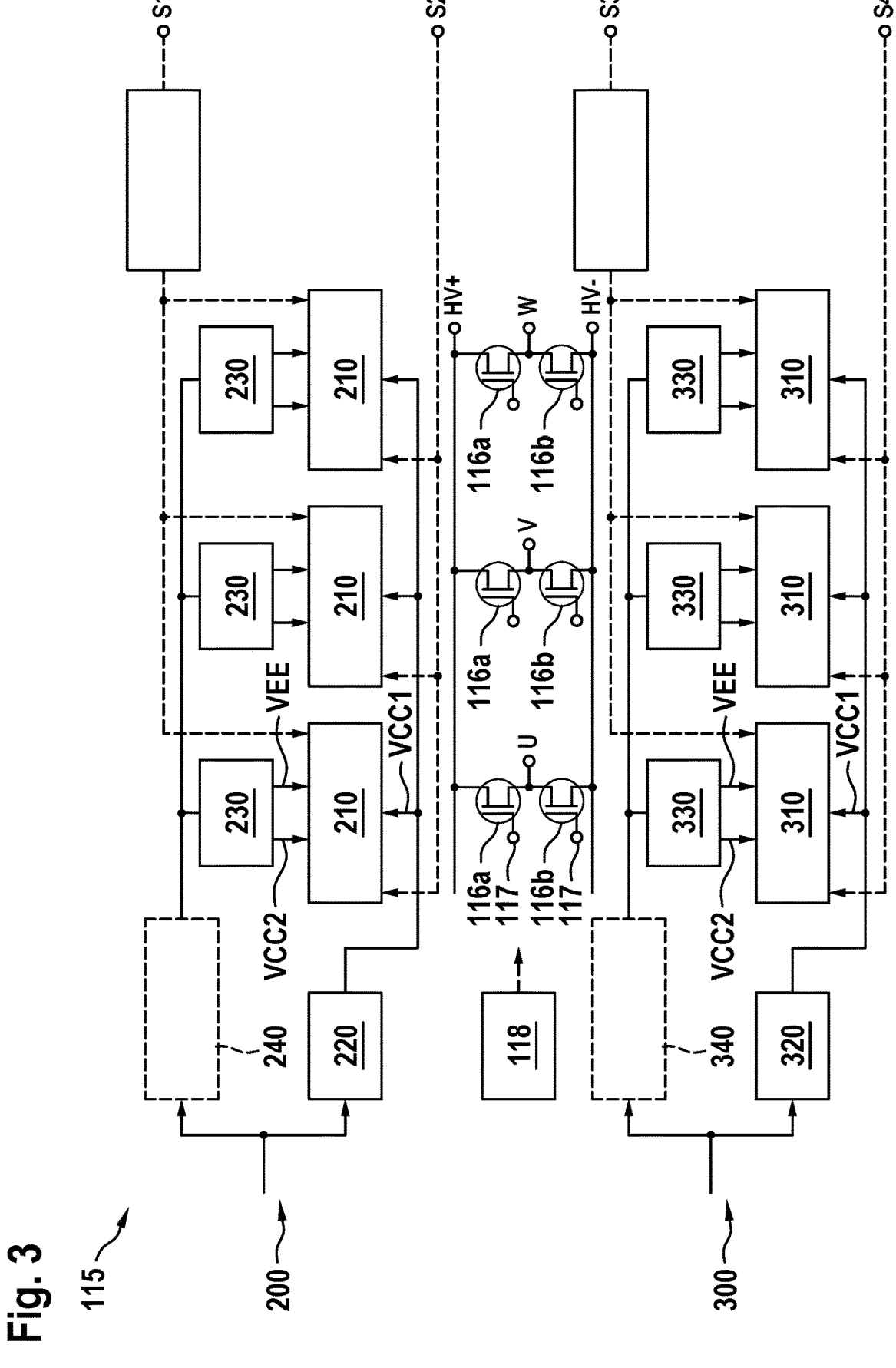
FIG. 3 schematically shows an inverter circuit as it can be used in a power supply circuit, in embodiments.

In FIGS. 1 and 2, the LS power supply circuit 300 is connected to the backup supply branch 130 via a blocking circuit 40*a*. In one embodiment, the blocking circuit 40*a* can have two diodes, as shown. If the low-voltage supply (at B+, B−) or the high-voltage supply (at HV+, HV−) are available, the LS power supply circuit 300 is supplied from the low-voltage branch 120. If the supply from the low-voltage branch 120 fails, the third safety disconnection circuit 33 disconnects the LS power supply circuit 300 from the low-voltage branch 110, and the LS power supply circuit 300 is supplied from the backup supply branch 130.

In FIG. 1, the safety control device 123 is connected to the backup supply branch 130 via a blocking circuit 40*b*. In one embodiment, the blocking circuit 40*b* may comprise two diodes, as shown.

In FIGS. 2, 4, 6 and 7, the safety control device 123 is connected to the backup supply branch 130 via a first power supply circuit 126*a*, and is connected to the supply branch 120*a* via a second power supply circuit 126*b*. The blocking circuit 40*b* is omitted.

Figure 4:
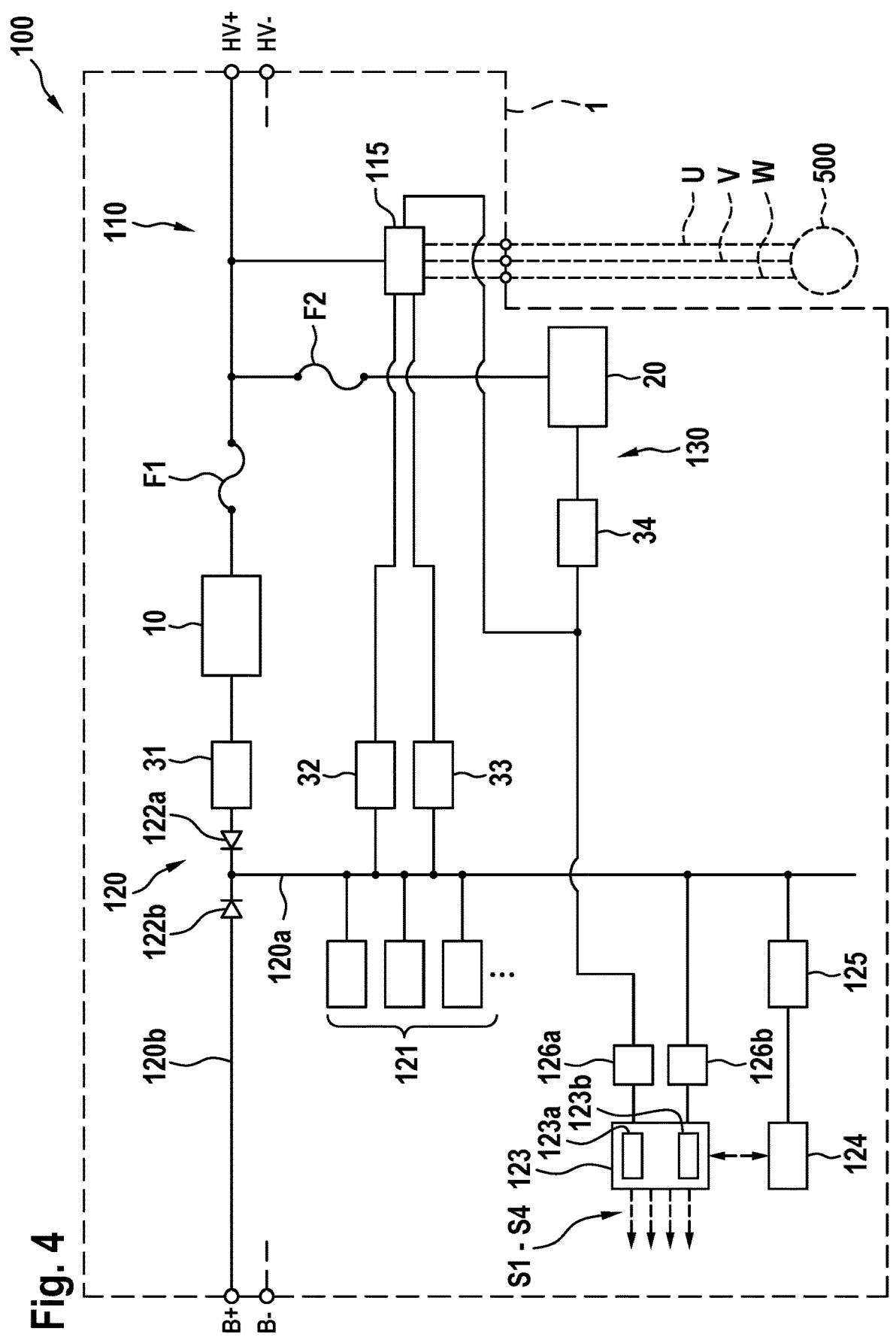
FIG. 4 schematically shows a further power supply circuit in an inverter, in embodiments.
Figure 6:
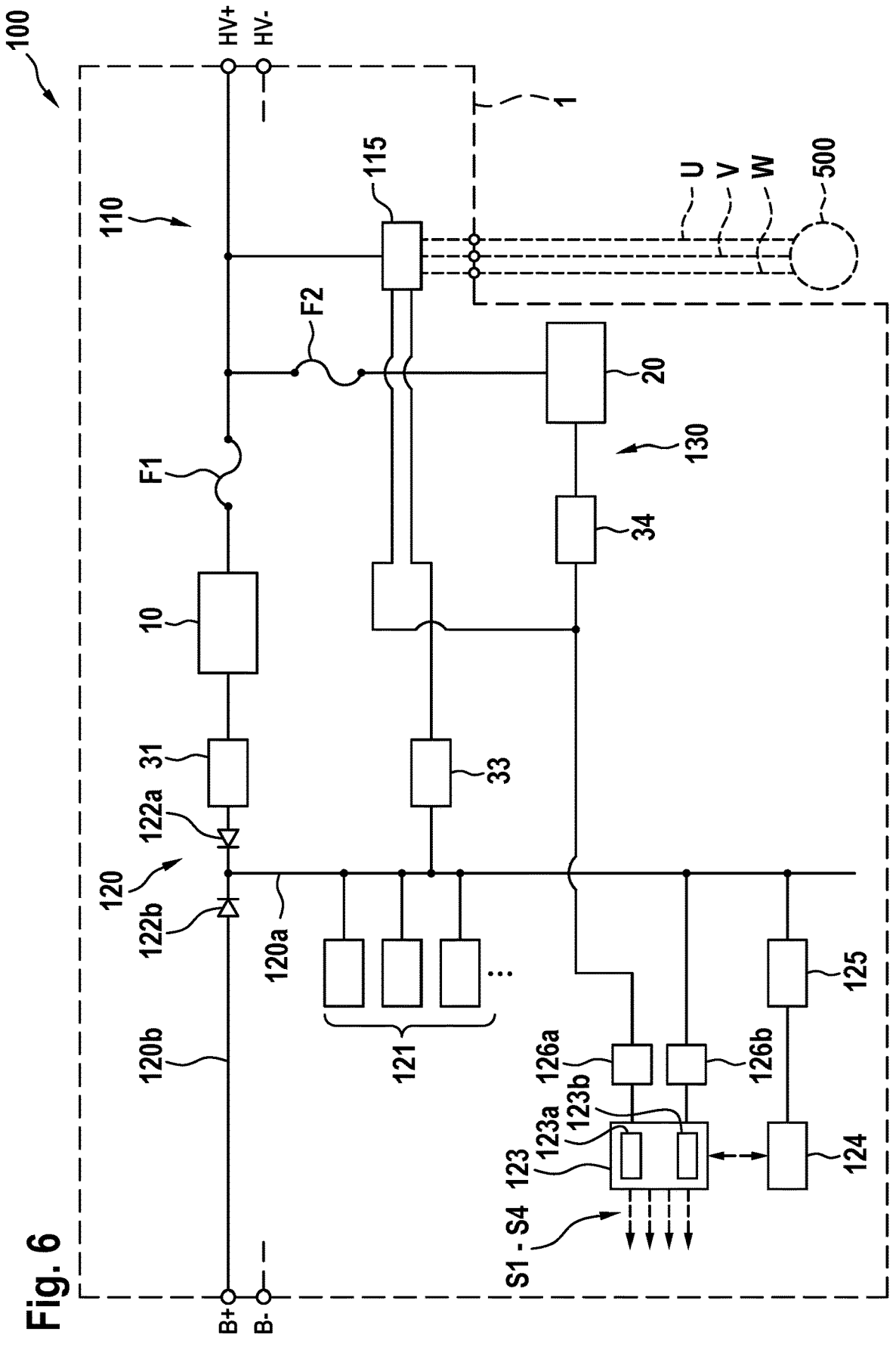
FIG. 6 schematically shows a further power supply circuit in an inverter, in embodiments.
Figure 7:
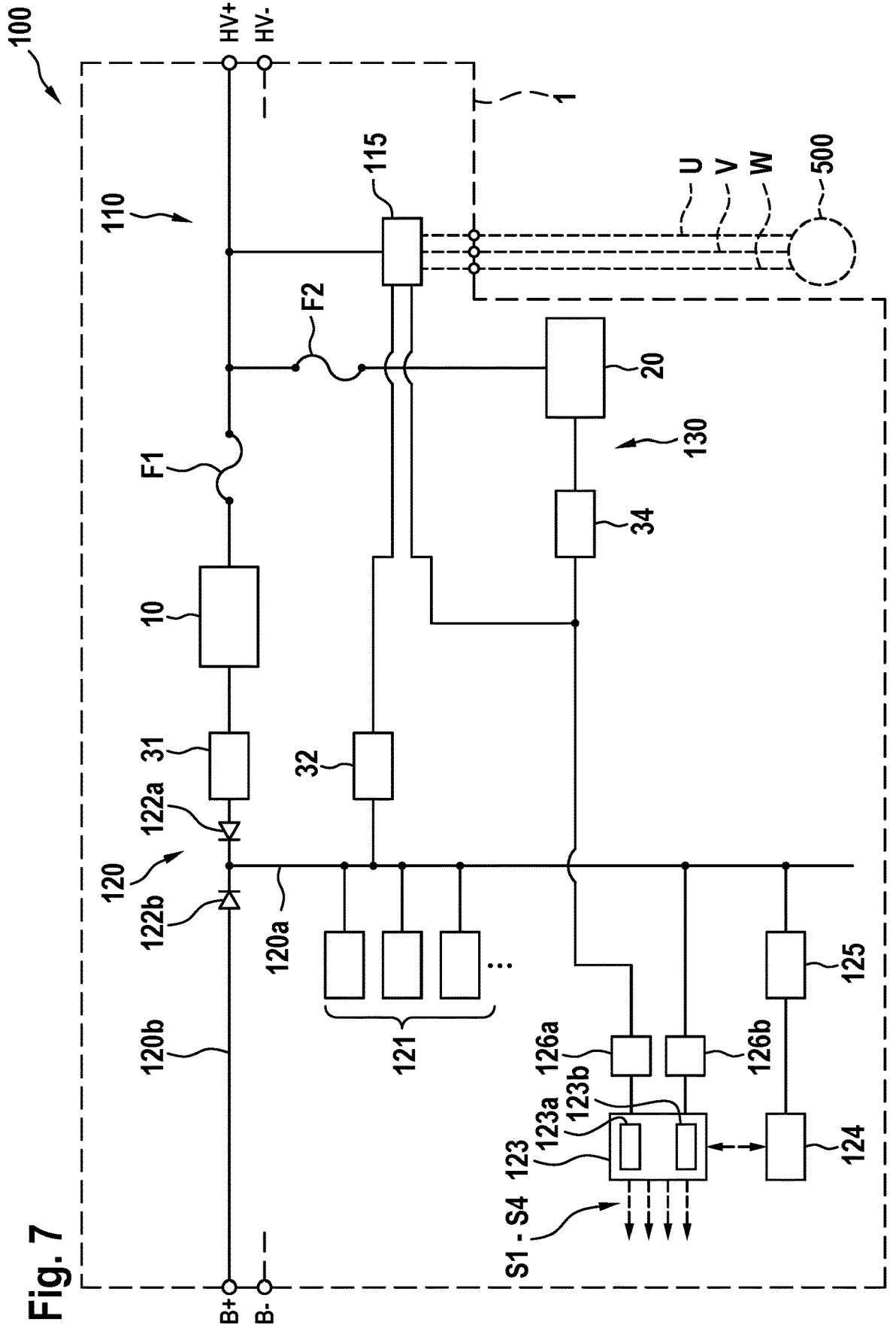
FIG. 7 schematically shows a further power supply circuit in an inverter, in embodiments.

FIGS. 4, 6 and 7 schematically show further embodiments of a power supply circuit according to the disclosure in an inverter 1, which differ from the embodiment shown in FIG. 2 in that the blocking circuit 40*a* is omitted.

FIGS. 1, 2, 4 and 7 show embodiments in which at least the at least one gate driver circuit 310 for the LS semiconductor switches 116*b* is supplied or can be supplied with energy from the backup supply branch 130. In FIG. 6, an embodiment is shown in which at least the at least one gate driver circuit 210 for the HS semiconductor switches 116*a* is supplied or can be supplied with energy from the backup supply branch 130.

If the low-voltage supply (at B+, B−) or the high-voltage supply (at HV+, HV−) are available, the safety control device 123 is supplied from the low-voltage branch 120, which in turn is supplied from the low-voltage network and the high-voltage branch 110. If the supply from the low-voltage branch 120 fails, the safety control device 123 is supplied from the backup supply branch 130.

A further option, which is not shown in the figure, is to also connect the power management circuit 125 to the backup supply branch 130 via a further blocking circuit.

The blocking circuits help to prevent current flow to other parts of the inverter 1, which can lead to an overload of the backup supply DC/DC converter 20 or to the fault being fed into other sub-networks.

To protect the primary and secondary sides of the operating DC/DC converter 10 and the backup supply DC/DC converter 20 respectively, a fuse F1, F2 is provided as a high-voltage disconnection circuit, so that in the event of a fault on the primary side, e.g. a short circuit in a transformer winding of an electrically insulating DC/DC converter or a short-circuited switch, the fuse isolates the faulty section.

Figure 5:
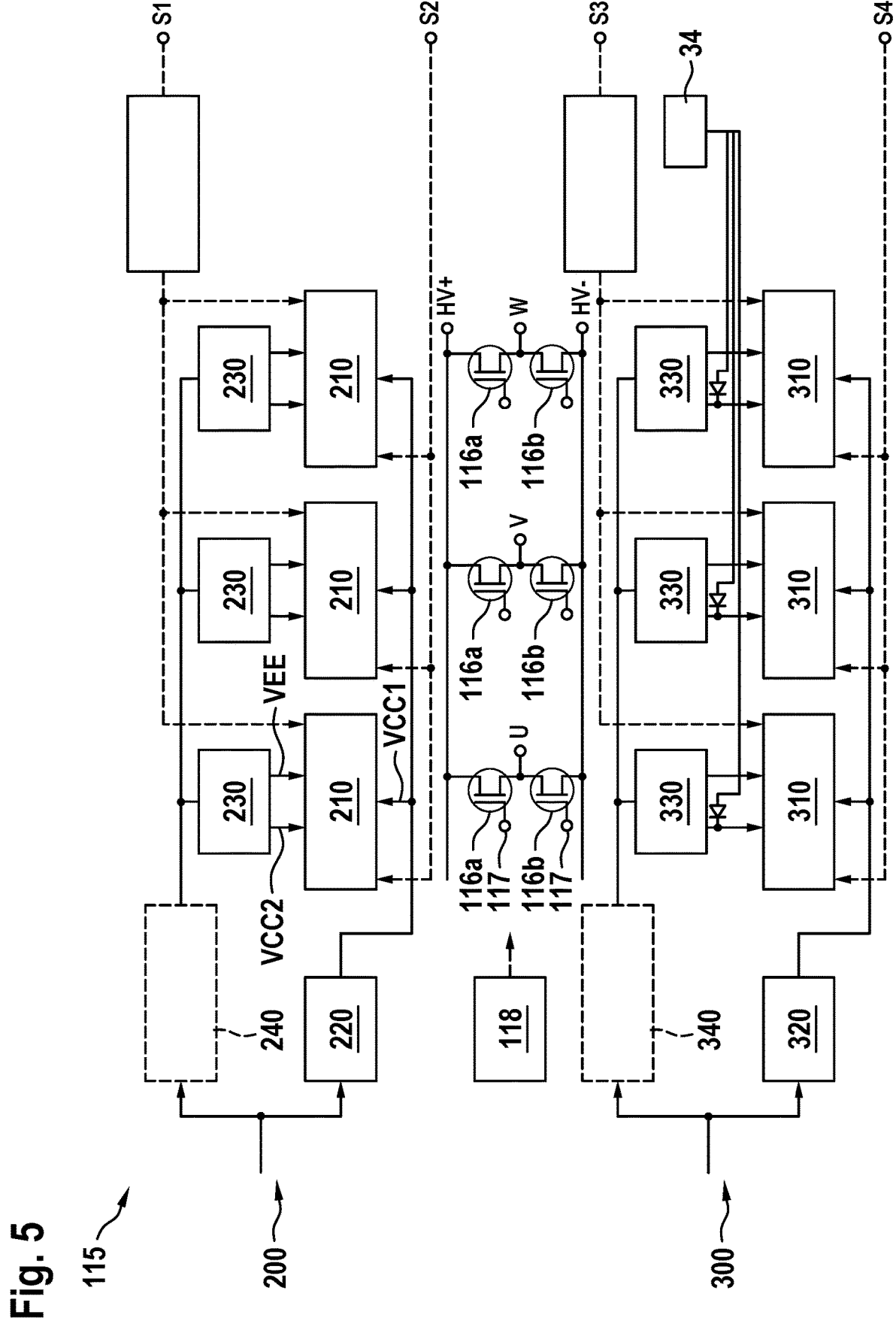
FIG. 5 schematically shows a further inverter circuit, as can be used in a power supply circuit as shown in FIG. 4, in embodiments.

As can be seen in connection with FIG. 5, where a further embodiment of an inverter circuit is shown, in FIG. 4 the backup supply branch 130 is connected to each voltage supply line VCC2 between the three LS bias voltage supply circuits 330 and the LS gate drivers 310 via the fourth safety disconnection circuit 34 and a blocking diode in each case.

This only guarantees the supply required for the LS gate driver 310 to initiate the safe state; it is not suitable for continuous operation. It is therefore sufficient to contact only the power supply line VCC2 to provide only the power for the gate driver to enter the safe state.

The backup supply branch 130 can also be connected to the first power supply circuit 126*a* and the first safety logic circuit 123*a* of the (functional) safety control device 123 via the fourth safety disconnection circuit 34. This connection supplies the first safety logic circuit 123*a* with power in all operating states. In the event of a failure of the main power supplies, the second safety logic circuit 123*b* may lose power, but the first safety logic circuit 123*a* may be activated and initiate the safe state for the LS gate drivers as they are also powered by the backup power supply.

In the power supply circuit according to FIG. 6, the HS power supply circuit 200 is supplied from the backup supply branch 130. The second safety disconnection circuit 32 is omitted. The first safety logic circuit 123*a* is also supplied from the backup supply branch 130 as before.

In the power supply circuit as shown in FIG. 7, the HS power supply circuit 300 is supplied from the backup supply branch 130. The third safety disconnection circuit 33 is omitted. The first safety logic circuit 123*a* is also supplied from the backup supply branch 130 as before.

In the variants shown in FIGS. 6 and 7, faults in the low-voltage branch 120 and in the backup supply branch 130 are isolated from each other. This means that the fault cannot be passed on from the low-voltage branch 120 to the backup supply branch 130 and vice versa.

If a fault occurs in the low-voltage branch 120 or the supply B+, B−, the backup supply branch 130 can guarantee the supply to the first safety logic circuit 123*a* and the respective LS or HS power supply circuit 200, 300 (only one of them). The execution of the safe state is therefore guaranteed.

The malfunctions and reactions described below can occur in the illustrated embodiment of a power supply circuit in an inverter:

Fault in low-voltage branch 120*b*:
Short circuit: The protection usually present in the low-voltage network (e.g. 12 V) (e.g. fuses, not shown) protects the supply branch 120*a* and interrupts the fault current. A current flow into the low-voltage network is blocked by the diode 122*b*.
The supply branch 120*a* is supplied with power via the operating DC/DC converter 10.
Open circuit: The current flow is not interrupted, but the supply branch 120*a* is supplied with current via the operating DC/DC converter 10. A current flow into the low-voltage network is blocked by the diode 122*b*.
Fault in high-voltage branch 110:
Short circuit: The fault is fed from the high-voltage network if there is no protection to limit the fault. This can lead to a latent fault.
The first safety disconnection circuit 31 isolates the operating DC/DC converter 10 from the low-voltage branch 110. However, the supply branch 120*a* can be supplied from the mains branch 120*b* and the safety control device 123 can bring the inverter circuit 115 into the safe state.
Depending on the priority set, either an active HS short-circuit (S1 and/or S2) or LS short-circuit (S3 and/or S4) is activated.
The fuse F1 can protect the primary and secondary sides of the operating DC/DC converter 10 and the first safety disconnection circuit 31 can protect the low-voltage branch 120.
Open circuit: The current flow is still not interrupted and the supply branch 120*a* is supplied with power from the mains branch 120*b*.
The first safety disconnection circuit 31 isolates the operating DC/DC converter 10 from the low-voltage branch 110. A reverse current in the operating DC/DC converter 10 is blocked by the diode 122*a*. Depending on the functional safety objectives, it may be necessary to trigger the safe state.
Depending on the priority set, either an active HS short-circuit (S1 and/or S2) or LS short-circuit (S3 and/or S4) can be activated.

Fault in supply branch 120*a*:
Short circuit: The fault can be fed from both sides from the high-voltage branch 110 and the mains branch 120*b*.
The first safety disconnection circuit 31 disconnects the operating DC/DC converter 10 from the low-voltage branch 120 and interrupts a possible power supply.
The protection usually provided in the low-voltage network (e.g. fuses, not shown) interrupts the other residual current.
In this case, the second safety logic circuit 123*b*, the higher-level control unit 124 and the LS power supply circuit 300 are not supplied, but at least the LS power supply circuit 300 and the first safety logic circuit 123*a* are supplied from the backup supply branch 130, and the transition to the safe state is ensured.
An LS short-circuit or safe state (S3 or S4) is activated.
Open circuit: The result depends heavily on the fault location. If there is insufficient voltage on the supply branch 120*a* due to the open circuit, the LS power supply circuit 300 and the first safety logic circuit 123*a* are supplied from the backup supply branch 130 and the transition to the safe state is ensured.
An LS short-circuit or safe state (S3 or S4) is activated.
Fault in the supply to the first safety logic circuit 123*a*:
Short circuit: The fault can be fed from both sides from the high-voltage branch 110 and the mains branch 120*b*. If there is no protection to limit the fault, a latent fault may occur, which increases the probability of a power interruption for the first safety logic circuit 123*a* and the higher-level control unit 124.
If the fault is at the output of the power supply circuit 126 (FIG. 1), it can impair the operation of the power supply circuit 126. If the power supply circuit 126 has the option of protection, the fault can be limited.
In the worst case, the first safety logic circuit 123*a* can lose the supply and the latent fault can lead to a complete power interruption in the supply branch 120*a*.
In this case, it is possible that in the concept shown in FIG. 1, the backup supply branch 130 also fails because the safety disconnection circuit 34 disconnects the backup supply DC/DC converter 20. This can cause a complete interruption of the power supply and, as a result of the loss of the supply branch 120*a* and the backup supply branch 130, prevent the safe state from being reached safely.
Therefore, the concept shown in FIG. 2 or 4, 6, 7 is preferred. In this concept, if the first power supply circuit 126*a* is faulty and the first safety logic circuit 123*a* loses the supply, the safety disconnection circuit 34 disconnects the backup supply DC/DC converter 20, but the supply branch 120*a* and, via it, the second power supply circuit 126*b* and the second safety logic circuit 123*b* as well as the HS power supply circuit 200 are supplied from the supply branch 120*a*, and the transition to the safe state is ensured (signals S1).
Open circuit: The first safety logic circuit 123*a* can lose the supply. In one embodiment, the second safety logic circuit 123*b* or the higher-level control unit 124 are set up so that the gate drivers 210 or 310 initiate the safe state.
Depending on the priority set, either an active HS short-circuit (S1 and/or S2) or LS short-circuit (S3 and/or S4) is activated.
Fault in the supply to the second safety logic circuit 123*b*:
Short circuit: The fault can be fed from both sides from the high-voltage branch 110 and the mains branch 120*b*. In the concept according to FIG. 1, the power management circuit 125 can have overcurrent protection and isolate the fault.

The supply to the power supply circuit 126 is unaffected, so that the first safety logic circuit 123*a* can initiate the safe state together with the HS power supply circuit 200 or the LS power supply circuit 300.

If the power management circuit 125 is faulty (e.g. has a short circuit), the fault can be fed from both sides from the high-voltage branch 110 and the mains branch 120*b*. In the worst case, the second safety logic circuit 123*b* can then lose the supply and the latent fault can lead to a complete power interruption in the supply branch 120*a*.

In this case, as shown in FIGS. 1, 2 and 4, 7, the first safety logic circuit 123*a* and the LS power supply circuit 300 are supplied from the backup supply branch 130, and the transition to the safe state is ensured (signals S3, S4).

In FIG. 6, the first safety logic circuit 123*a* and the HS power supply circuit 200 are supplied from the backup supply branch 130, and the transition to the safe state is ensured (signals S1, S2).

Open circuit: The second safety logic circuit 123*b* can lose the supply. In one embodiment, the first safety logic circuit 123*a* or the higher-level control unit 124 are set up so that the gate drivers 210 or 310 initiate the safe state. Depending on the priority set, either an active HS short circuit (S1 and/or S2) or LS short circuit (S3 and/or S4) is activated.

Fault in the supply of the higher-level control unit 124:

Short circuit in the power management circuit 125: The fault can be fed from both sides from the high-voltage branch 110 and the mains branch 120*b*. If there is no protection to limit the fault, a latent fault may occur, which increases the probability of a power interruption for the safety control device 123 and the higher-level control unit 124.

If the fault is at the output of the power management circuit 125, the power management circuit 125 can protect the supply branch 120*a*. A failure of the higher-level control unit 124 can be detected by the power management circuit 125 and the safe state is initiated.

In the worst case, the higher-level control unit 124 can lose the supply and the latent fault can lead to a complete power interruption in the supply branch 120*a*.

In one embodiment, the inverter circuit 115 is arranged such that the gate drivers 310 initiate the safe state if communication between the safety control device 123 and the supervisory control unit 124 is lost or the state of the ASC signals changes due to a power failure.

If the failure of the power management circuit 125 leads to a complete interruption of the power supply in the supply branch 120*a*, the LS power supply circuit 300 and the safety control device 123 are supplied from the backup supply branch 130 in the concept according to FIG. 2, and the transition to the safe state is ensured.

Depending on the defined priority or availability of the power supply circuits 200 and 300, either an active HS short circuit (S1 and/or S2) or LS short circuit (S3 and/or S4) is activated.

Open circuit: The higher-level control unit 124 can lose the power supply. In one embodiment, the inverter circuit 115 is set up so that the gate drivers 310 initiate the safe state if communication between the safety control device 123 and the higher-level control unit 124 is lost or the state of the ASC signals changes due to a power failure.

Alternatively, the first safety logic circuit 123*a* may initiate the safe state when energized by the power supply circuit 126.

Depending on the priority set, either an active HS short-circuit (S1 and/or S2) or LS short-circuit (S3 and/or S4) is activated.

Fault in the HS power supply circuit 200:

Short circuit: The fault can be fed from both sides from the high-voltage branch 110 and the mains branch 120*b*.

The second safety disconnection circuit 32 interrupts the faulty area. The fault does not spread to other parts of the supply branch 120*a*.

Due to the loss of communication with the HS power supply circuit 200 or the absence of a feedback status from the HS power supply circuit 200, or an error message from the second safety disconnection circuit 32, the safety control device 123 or the higher-level control unit 124 recognizes the loss of power supply to the HS gate drivers; the inverter circuit can transition to the safe state with the LS gate drivers.

An LS short circuit (S3 or S4) is activated.

Open circuit: Due to the loss of communication and the undervoltage in the power supply of the HS gate driver, the safety control device 123 or the higher-level control unit 124 detects the loss of the power supply of the HS gate drivers; the inverter circuit can enter the safe state with the LS gate drivers.

An LS short circuit (S3 or S4) is activated.

Fault in the LS power supply circuit 300:

Short circuit: The fault can be fed from both sides from the high-voltage branch 110 and the mains branch 120*b*.

The third safety disconnection circuit 33 interrupts the faulty area. The fault does not spread to other parts of the supply branch 120*a*.

It is possible that the backup supply branch 130 feeds the fault; in this case, the fourth safety disconnection circuit 34 interrupts the fault current. The fault does not spread to other parts of the supply branch 120*a*.

Due to the loss of communication with the LS power supply circuit 300 or the absence of a feedback status from the LS power supply circuit 300, or an error message from the third or fourth safety disconnection circuit 33, 34, the safety control device 123 or the higher-level control unit 124 recognizes the loss of power supply to the LS gate drivers; the inverter circuit can enter the safe state with the HS gate drivers.

A HS short circuit (S1 or S2) is activated.

Open circuit: Due to the loss of communication and/or undervoltage in the power supply of the LS gate driver, the safety control device 123 or the higher-level control unit 124 detects the loss of power supply to the LS gate drivers, and the safe state signal (S1 and/or S2) is triggered.

A HS short circuit (S1 or S2) is activated.

The disclosure can increase functional safety and reliability without the need to prove complete redundancy for the power supply circuit in an inverter, which would increase costs by a factor of 2. Advantageously, the size of the backup supply DC/DC converter does not have to be large enough to supply the entire power supply circuit, which leads to a cost reduction when implementing this concept.

The invention claimed is:

1. A power supply circuit (100) in an inverter (1) for driving an electrical machine (500), the power supply circuit (100) having a high-voltage branch (110), a low-voltage branch (120), a backup supply branch (130), an operating DC/DC converter (10), which is connected on the one hand to the high-voltage branch (110) and on the other hand to the low-voltage branch (120), a backup supply DC/DC converter (20), which is connected on the one hand to the high-voltage branch (110) and on the other hand to the backup supply branch (130), an inverter circuit (115) for connecting the electrical machine (500) to the high-voltage branch (110), a safety control device (123) which is set up to switch the inverter circuit (115) to a safe state when a shutdown situation is present, wherein the inverter circuit (115) and the safety control device (123) are supplied with energy from the low-voltage branch (120), wherein the inverter circuit (115) and the safety control device (123) are additionally supplied or can be supplied with energy from the backup supply branch (130).

2. The power supply circuit (100) according to claim 1, wherein a blocking circuit (40a, 40b) is arranged between the low-voltage branch (120) and the backup supply branch (130), which prevents a flow of energy between the low-voltage branch (120) and the backup supply branch (130).

3. The power supply circuit (100) according to claim 1, wherein the low-voltage branch (120) comprises a supply branch (120a) for distributing current to components of the inverter (1) and a mains branch (120b) for connection to a low-voltage network, the inverter circuit (115) and the safety control device (123) being supplied with power from the supply branch (120a), the mains branch (120b) being arranged to be connected to a power supply, wherein a second blocking circuit (122a, 122b) is arranged between the supply branch (120a) and the operating DC/DC converter (10), which prevents a flow of energy from the supply branch (120a) into the operating DC/DC converter (10), and/or is arranged between the supply branch (120a) and the mains branch (120b), which prevents a flow of energy from the supply branch (120a) into the mains branch (120b).

4. The power supply circuit (100) according to claim 1, wherein the operating DC/DC converter (10) is disconnectable from the low-voltage branch (120) by means of a first safety disconnection circuit (31) and/or is disconnectable from the high-voltage branch (110) by means of a first high-voltage disconnection circuit (F1).

5. The power supply circuit (100) according to claim 1, wherein the inverter circuit (115) comprises a number of high-side semiconductor switches (116a) and a number of low-side semiconductor switches (116b) and at least one gate driver circuit (210; 310) for the high-side and low-side semiconductor switches, wherein the at least one gate driver circuit (210; 310) is powered from the low-voltage branch (120).

6. The power supply circuit (100) according to claim 5, wherein the at least one gate driver circuit (210) for the high-side semiconductor switches (116a) can be disconnected from the low-voltage branch (120) by means of a second safety disconnection circuit (32).

7. The power supply circuit (100) according to claim 5, wherein the at least one gate driver circuit (310) for the low-side semiconductor switches (116b) can be disconnected from the low-voltage branch (120) by means of a third safety disconnection circuit (33).

8. The power supply circuit (100) according to claim 5, wherein at least the at least one gate driver circuit (310) for the low-side semiconductor switches (116b) and/or at least the at least one gate driver circuit (210) for the high-side semiconductor switches (116a) is or can be supplied with energy from the backup supply branch (130).

9. The power supply circuit (100) according to claim 5, wherein the at least one gate driver circuit (210; 310) for the semiconductor switches comprises exactly one gate driver circuit (210; 310) for each of the high-side semiconductor switches (116a) and/or low-side semiconductor switches (116b).

10. The power supply circuit (100) according to claim 5, wherein the at least one gate driver circuit (210; 310) for the high-side and low-side semiconductor switches is supplied with power from at least one bias voltage supply circuit (230; 330), wherein the at least one gate driver circuit (210; 310) and/or at least one bias voltage supply circuit (230; 330) is supplied with power from the low-voltage branch (120).

11. The power supply circuit (100) according to claim 1, wherein the backup supply DC/DC converter (20) is disconnectable from the backup supply branch (130) by means of a fourth safety disconnection circuit (34) and/or is disconnectable from the high-voltage branch (110) by means of a second high-voltage disconnection circuit (F2).

12. The power supply circuit (100) according to claim 11, wherein the safety control device (123) is adapted to detect the presence of a shutdown situation when at least one of the first, second, third and fourth safety disconnection circuits (31-34) is in a non-conductive state.

13. The power supply circuit (100) according to claim 1, wherein the safety control device (123) and/or the inverter circuit (115) comprises at least two power supply circuits (123a, 123b), wherein a first (123a) of the at least two power supply circuits is or can be supplied with power from the low-voltage branch (120) and a second (123b) of the at least two power supply circuits is or can be supplied with power from the backup supply branch (130).

14. A method of operating the power supply circuit (100) according to claim 1, comprising:

in the presence of a shutdown situation, bringing the inverter circuit (115) into a safe state.

15. The method according to claim 14, comprising:

detecting that a shutdown situation is present when at least one of the first, second, third and fourth safety disconnection circuits (31-34) detects a fault and/or when at least one of the first, second, third and fourth safety disconnection circuits (31-34) is in an open state.

16. The method according to claim 14, comprising:

detecting that a shutdown situation is present when a fault occurs in the operating DC/DC converter (10) and/or the backup supply DC/DC converter (20).

17. The method according to claim 14, comprising:

detecting that a shutdown situation is present when the at least one gate driver circuit (210; 310) for the high-side and low-side semiconductor switches detects a fault, in particular in the power supply from the low-voltage branch (120).

18. A safety control device (123) that is configured to perform a method of operating the power supply circuit (100) according to claim 1, comprising in the presence of a shutdown situation, bringing the inverter circuit (115) into a safe state.

19. An inverter (1) comprising the power supply circuit (100) according to claim 1.

* * * * *